(12) United States Patent
Horwitz et al.

(10) Patent No.: US 10,227,760 B2
(45) Date of Patent: Mar. 12, 2019

(54) SYSTEM AND METHOD FOR A SMART FAUCET

(71) Applicant: FLOWE.green, LLC, Campbell, CA (US)

(72) Inventors: Jeffery Perrywade Horwitz, Campbell, CA (US); Christopher Kirn, Campbell, CA (US); Saeid Bashash, San Jose, CA (US); Adam B. Olson, San Jose, CA (US); Raviteja Datta Akella, San Jose, CA (US); Omar Awad, San Jose, CA (US)

(73) Assignee: Flowe Green, LLC, Campbell, CA (US)

( * ) Notice: Subject to any disclaimer, the term of this patent is extended or adjusted under 35 U.S.C. 154(b) by 0 days.

(21) Appl. No.: 15/266,666

(22) Filed: Sep. 15, 2016

(65) Prior Publication Data

US 2017/0260722 A1  Sep. 14, 2017

Related U.S. Application Data

(60) Provisional application No. 62/305,500, filed on Mar. 8, 2016.

(51) Int. Cl.
*E03C 1/05* (2006.01)
*G01F 15/06* (2006.01)

(52) U.S. Cl.
CPC .............. *E03C 1/057* (2013.01); *G01F 15/06* (2013.01)

(58) Field of Classification Search
CPC ........................................................ E03C 1/057
USPC .............................................................. 340/12.25
See application file for complete search history.

(56) References Cited

U.S. PATENT DOCUMENTS

| | | | | |
|---|---|---|---|---|
| 3,904,167 | A * | 9/1975 | Touch | F16K 31/02 137/606 |
| 4,682,628 | A * | 7/1987 | Hill | E03C 1/05 137/624.11 |
| 5,170,514 | A * | 12/1992 | Weigert | E03C 1/057 4/313 |
| 5,581,171 | A * | 12/1996 | Kerfoot | B60L 11/1811 320/137 |
| 5,755,262 | A * | 5/1998 | Pilolla | E03C 1/055 137/625.17 |
| 5,813,655 | A * | 9/1998 | Pinchott | A01G 25/165 239/67 |
| 6,431,204 | B1 * | 8/2002 | Ball | E03C 1/02 137/360 |
| 2002/0166986 | A1 * | 11/2002 | Remby | A01G 25/16 251/129.04 |
| 2005/0098650 | A1 * | 5/2005 | Gross | E03B 9/20 239/24 |
| 2008/0112160 | A1 * | 5/2008 | Robinson | F21S 9/02 362/183 |

(Continued)

*Primary Examiner* — Ojiako K Nwugo
(74) *Attorney, Agent, or Firm* — Hankin Patent Law, APC; Amy Embert (57) ABSTRACT

The present invention relates to the field of fluid flow through pipes and especially to the regulation of water flow through a faucet. A system and method for a smart faucet is presented. The system comprises a remote controlled faucet having a solenoid valve for controlling water flow, an electronic circuit for controlling the solenoid wherein the circuit includes a radio receiver, a remote sending unit for transmitting commands to the radio receiver, and a battery.

13 Claims, 11 Drawing Sheets

(56) References Cited

U.S. PATENT DOCUMENTS

| | | | |
|---|---|---|---|
| 2008/0283786 A1* | 11/2008 | Snodgrass | E03C 1/057 251/129.04 |
| 2009/0117822 A1* | 5/2009 | Coffey | F41B 9/0021 446/473 |
| 2009/0159017 A1* | 6/2009 | Tsuge | F24D 19/1051 122/14.1 |
| 2010/0065764 A1* | 3/2010 | Canpolat | E03C 1/057 251/129.04 |
| 2013/0165828 A1* | 6/2013 | Sullivan | A61C 17/16 601/165 |
| 2014/0261780 A1* | 9/2014 | Thomas | E03C 1/057 137/468 |
| 2014/0345726 A1* | 11/2014 | Seggio | F16K 19/006 137/606 |
| 2014/0359935 A1* | 12/2014 | Veros | E03C 1/055 4/677 |
| 2015/0040997 A1* | 2/2015 | Blake | E03C 1/057 137/315.03 |
| 2015/0068605 A1* | 3/2015 | Shai | E03C 1/02 137/1 |
| 2016/0033171 A1* | 2/2016 | Mase | F24H 9/2035 122/14.3 |
| 2016/0214041 A1* | 7/2016 | Miller | B01D 35/04 |
| 2017/0335553 A1* | 11/2017 | Martin | A45D 20/08 |

\* cited by examiner

SECTION A-A

SYSTEM AND METHOD FOR A SMART FAUCET

CROSS-REFERENCE TO RELATED APPLICATIONS

This application claims priority under 35 U.S.C. § 119(e) of U.S. Provisional Patent Application No. 62/305,500, filed Mar. 8, 2016, entitled System and Method for a Smart Faucet by Jeffery Horwitz and Christopher Kirn, which application is incorporated by reference herein.

BACKGROUND OF THE INVENTION

1. Field of the Invention

The present invention relates to the field of fluid flow through pipes and especially to the regulation of water flow through a faucet.

2. Related Art

Water is a precious resource. It becomes even more precious when it is scarce. A severe decrease in precipitation, known as drought, is a recurring problem in many regions throughout the world. In the United States, for example, drought conditions spanning different sections of the Union have been experienced at various times in its history. Perhaps the most famous drought in the United States being the drought of the 1930's known as the "Dust Bowl," centered in the panhandles of Texas and Oklahoma. Recently, starting in 2011, the Western States, especially California, have been experiencing a severe drought.

The period between 2011 and 2014 have been the driest in California history. On Jan. 17, 2014, California's governor proclaimed a State of Emergency throughout the State of California because of the ongoing drought. This State of Emergency, imposed through executive authority, mandated that the State Water Resources Control Board implement a statewide reduction of 25 percent in potable urban water usage and called on the public to reduce water consumption, among other emergency measures. Various conservation measures have been enacted by agencies of California that are still in place at the time of the filing of this application. An important place in the water distribution system to conserve water is at the faucets of dwellings, such as, for example, single-family homes and apartments; and in commercial buildings, such as hotels and restaurants. One approach to help conserve water is to install hands-free faucets that are located in the kitchens and bathrooms of the foregoing structures. In addition to helping conserve water, hands-free faucets have other advantages, as described below.

One type of hands-free faucet was disclosed in U.S. Pat. No. 9,157,548 and teaches a foot pedal assembly connected by wire to a valve assembly located in the plumbing under a sink. The primary disadvantage of this type of hands-free faucet is that the standard plumbing under the sink must be modified for the insertion of a mechanical valve assembly. Another significant disadvantage is that the pedal is not designed to be operated by a hand, elbow or knee.

Another hands-free faucet was disclosed by U.S. Pat. No. 5,226,629 issued on Jul. 13, 1993 to Millman et al. Millman teaches a radio controlled faucet with a valve assembly attachable to a nozzle of the faucet. The valve assembly disclosed in Millman has a small pinion gear driven by a battery-powered motor for moving a gate valve member mounted on a rectilinear track. The valve assembly also includes a radio receiving unit for actuating a motor that controls water flow by turning a gear-driven motor, where the radio signal comes from a sending unit operated by the user's foot. Although Millman teaches a hands-free faucet that does not require modifying the plumbing under the sink to insert a valve assembly and does not require a wire, there are numerous disadvantages to the remote controlled faucet taught by Millman. One disadvantage is that the gear-driven motor in the valve assembly consumes too much energy that quickly depletes the battery and is subject to mechanical failure from wear-and-tear. A second disadvantage is that the valve assembly has no way to recharge the battery. A third disadvantage is that the mechanical system disclosed is expensive to manufacture. In view of these and other disadvantages, the present invention overcomes the shortcomings and deficiencies in the related art.

BRIEF SUMMARY

The present invention is directed to a smart faucet. A smart faucet having the features of the present invention comprises a remote controlled faucet having a solenoid valve for controlling water flow, an electronic circuit for controlling the solenoid wherein the circuit includes a radio receiver, a remote sending unit for transmitting commands to the radio receiver, and a battery.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Referring now in detail to the drawings, the reference numeral 100 denotes generally a remote controlled faucet in accordance with this invention.

Figure 1:
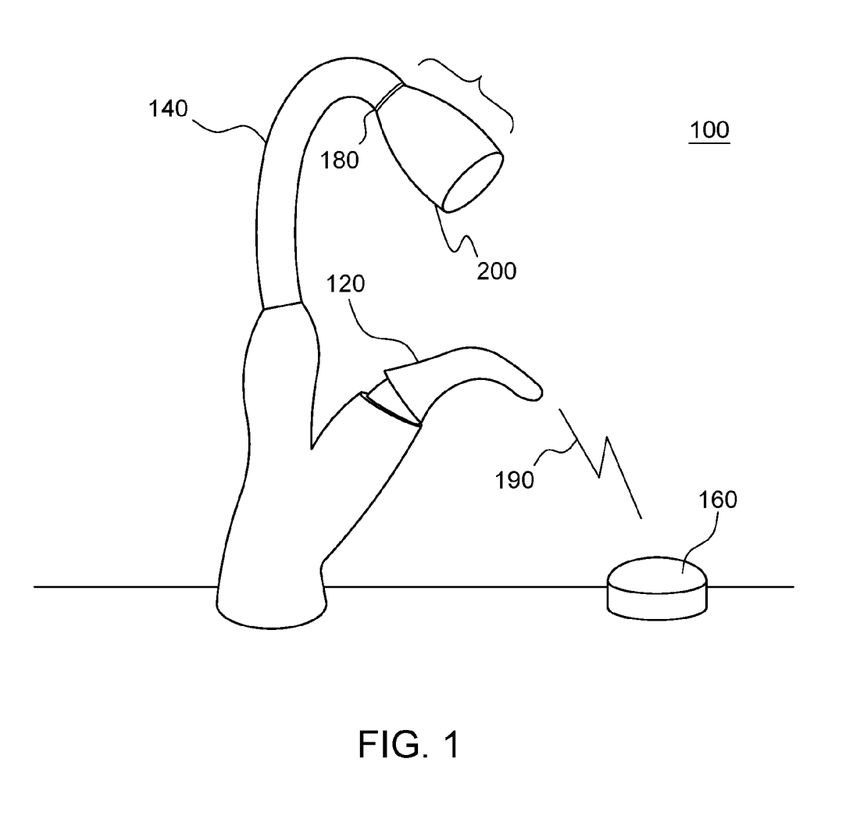
FIG. 1 is a perspective view illustrating one embodiment of a remote controlled faucet of this invention showing the self-contained valve assembly attached to the nozzle of said faucet.

Referring now to FIG. 1, there is shown a remote controlled faucet 100 with a single-lever 120 for manual flow control and a spout 140 having a self-contained valve assembly 200 attached to nozzle 180 using certain male and/or female threaded adapters (not shown) that allow for after-market attachment of valve assembly 200. Valve assembly 200 replaces the conventional assembly attached to nozzle 180. Valve assembly 200 is intended to be either supplied as part of a new remote controlled faucet 100 or as a retro-fit for an existing conventional faucet.

A user operates remote sending unit 160 such that, by applying pressure, it communicates with assembly 200 using certain standard short-range radio frequency transmissions 190. These transmissions can be, for example, FM, Bluetooth, ZigBee or XBee or a similar FCC approved radio frequency band that are implemented using commercially available radio frequency modules. The method for turning on and turning off the flow of water in faucet 100 can be implemented in at least two ways. In one embodiment, depending on where the user places sending unit 160, water is commanded to flow in assembly 200 by pressing and holding sending unit 160 with an appendage, such as a hand, elbow, knee, foot or part of a mobility aid (e.g., the arm of a wheelchair). Keeping pressure on sending unit 160, allows water to flow continuously. By releasing sending unit 160, the user can turn off the flow of water.

In another embodiment, pressing sending unit 160 with a single tap, turns on the flow in assembly 200. Pressing sending unit 160 a second time turns off the flow in assembly 200.

In another embodiment, pressing sending unit 160 with a double tap places the assembly 200 in an "always on" mode. Pressing sending unit 160 again, this time with a single tap discontinues the "always on" mode.

Studies have shown that the kitchen faucet is one of the most unsanitary locations in a typical home. The advantage of the knee or foot location is that it is more sanitary for a user than operating remote controlled faucet 100 by using lever 120, and when used in this mode, faucet 100 greatly reduces the exposure to germs and pathogens that infect faucets typically found in kitchens and bathrooms. In addition, the placement of sending unit 160 may allow the faucet 100 to be accessible by persons using wheelchairs or other aids and may make faucet 100 a candidate for compliance with the Americans with Disabilities Act of 1990 (ADA) and amendments thereto.

Figure 2A:
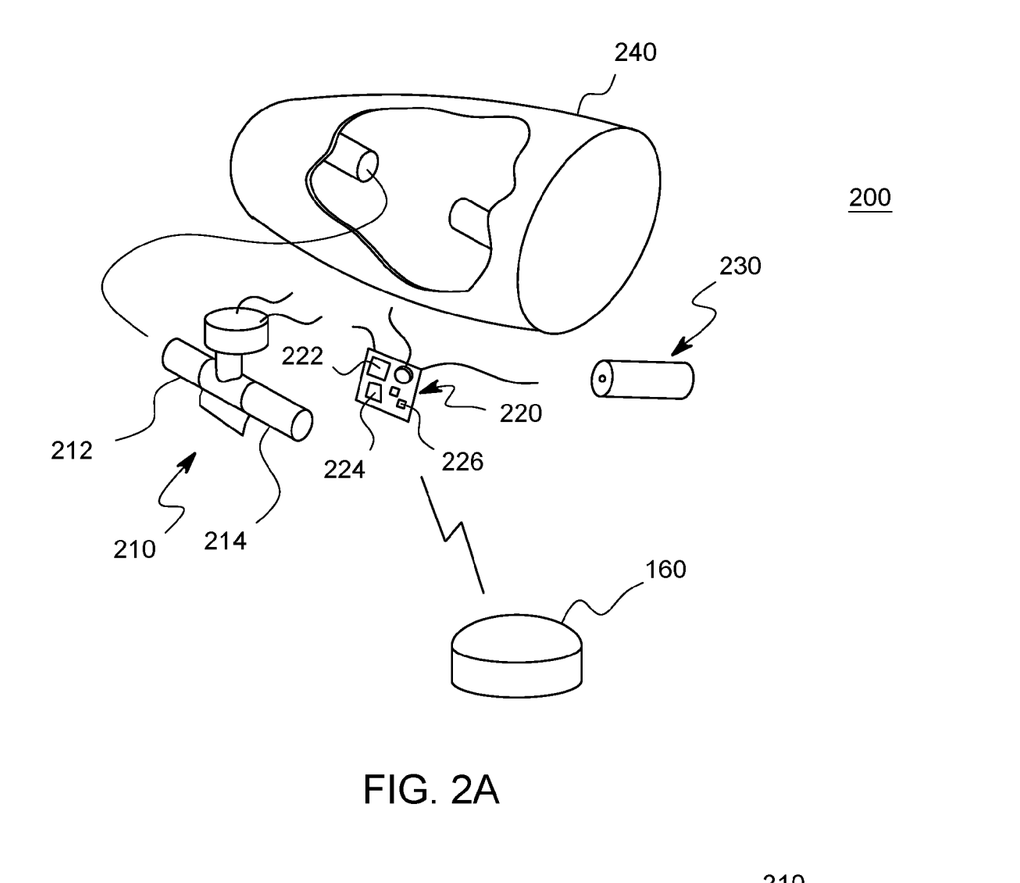
FIG. 2A is a perspective view of one embodiment of the remote controlled faucet of this invention showing an exploded view of the parts of the valve assembly attached to a nozzle of said faucet.
Figure 2B:
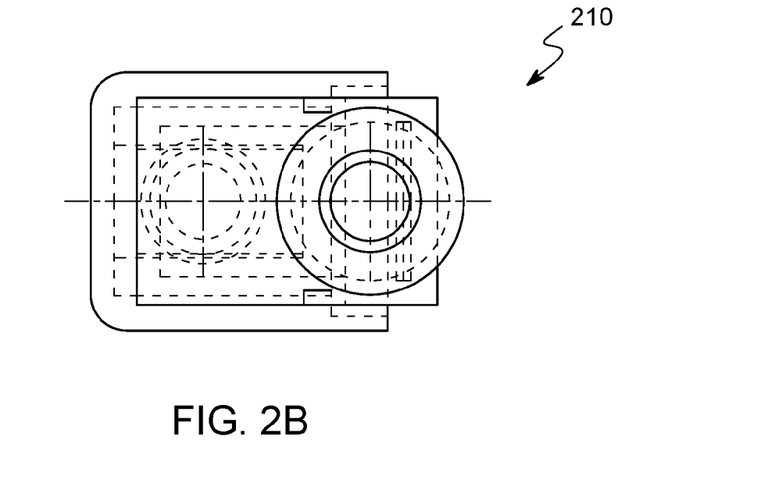
FIGS. 2B-2E are perspective schematic drawings of one embodiment of the solenoid valve of said valve assembly.
Figure 2C:
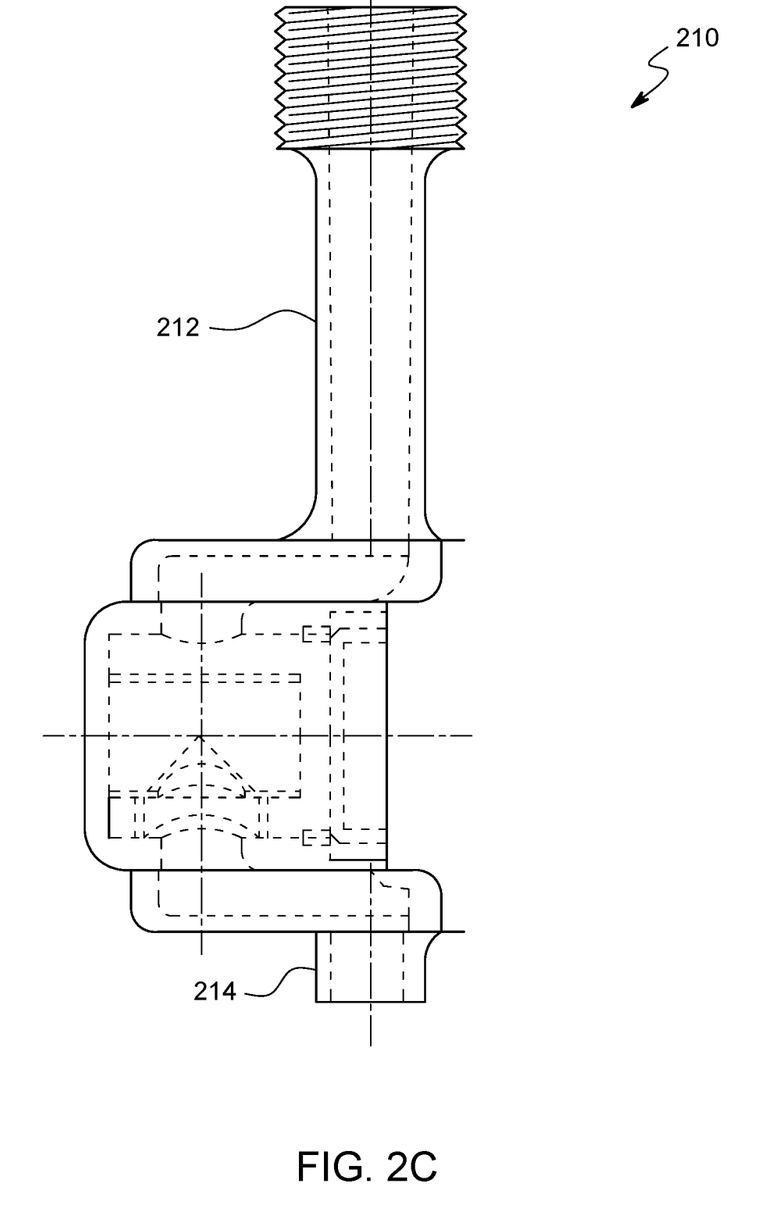
Figure 2D:
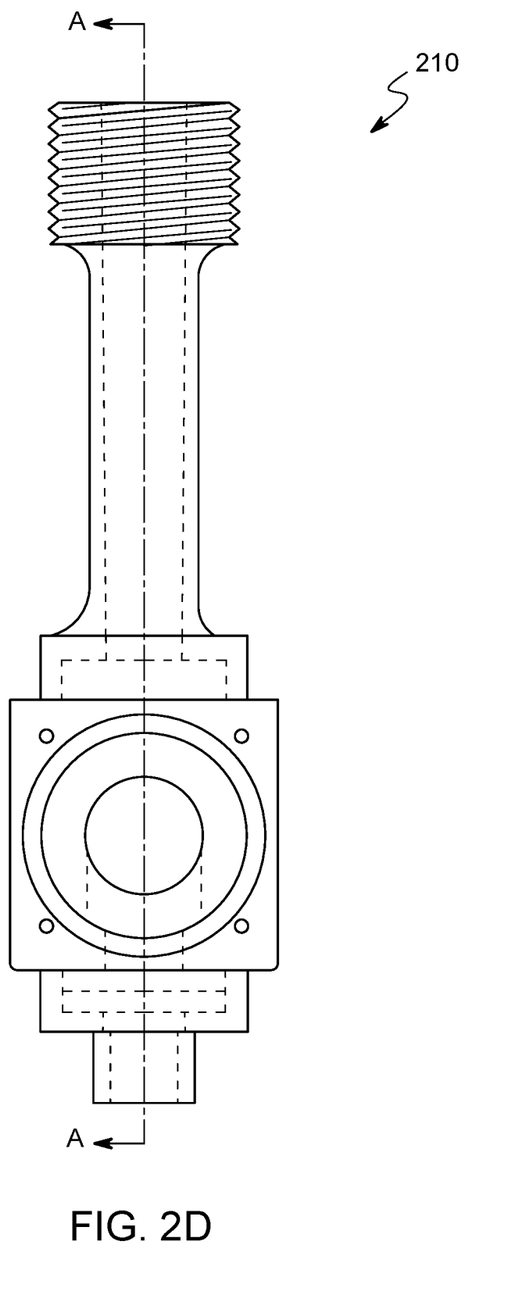
Figure 2E:
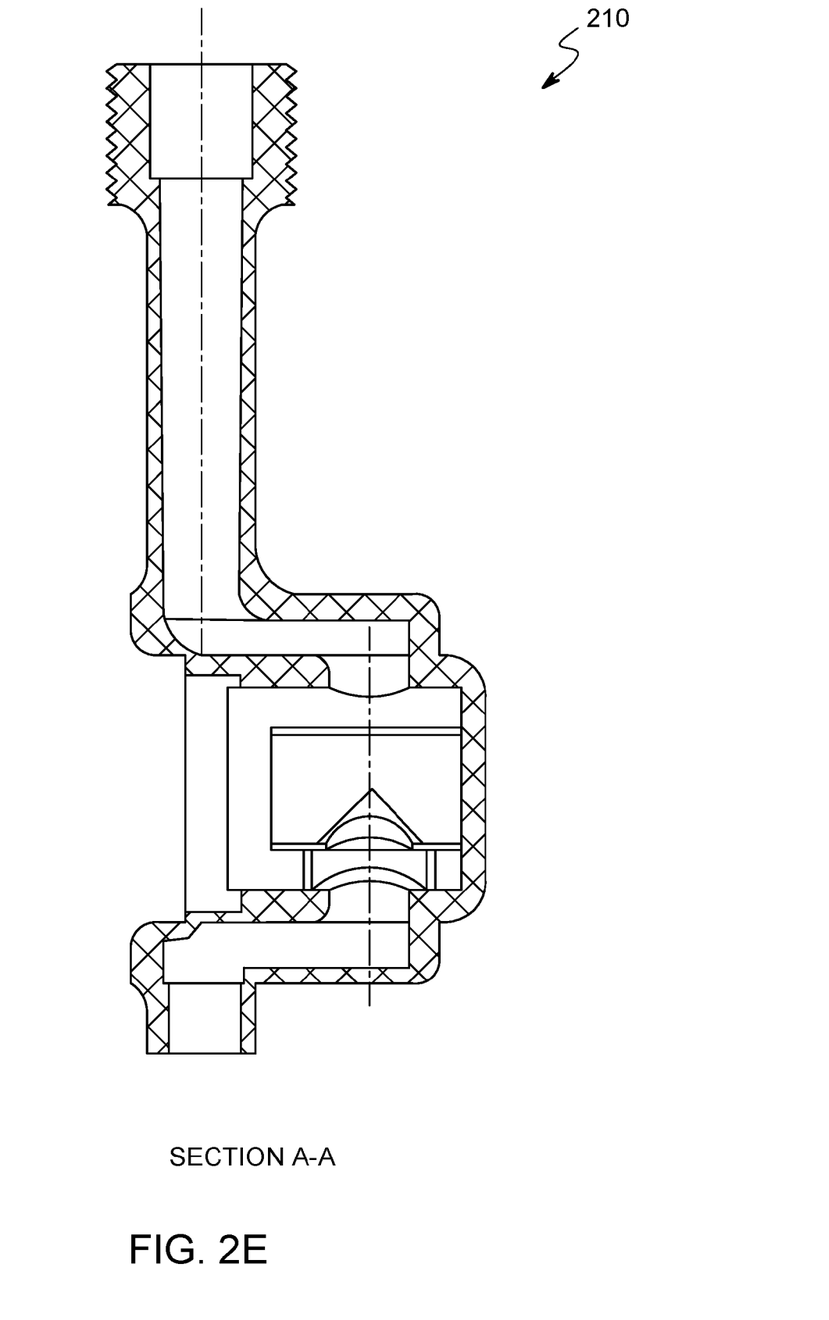

Referring to FIG. 2A, one alternative embodiment of the faucet 100 is a valve assembly 200 that encloses a two-port solenoid 210, a printed circuit board (PCB) 220 and a battery 230. In one embodiment, these components are placed inside a housing 240. Solenoid 210 has an inlet water channel 212 and an outlet water channel 214. Solenoid 210 operates by opening and closing a valve allowing water to flow or stop flowing, as its internal coils are energized, by the user operating sending unit 160. In one embodiment, solenoid 210 uses a bistable valve that requires power only in transition from open to close or vice versa. When the bistable valve is opened or closed, no power needs to be supplied to solenoid 210. Bistable solenoid valves or bistable solenoid actuators are well known to those of ordinary skill in the art and are described in detail in, for example, U.S. Pat. No. 4,533,890 and U.S. Patent Application Pub. No. US 2003/0136928.

Solenoid 210 is connected by wires to PCB 220 containing one or more integrated circuits (ICs) that include a wireless communications IC, such as a Bluetooth, WiFi, ZigBee, XBee or a similar radio frequency module 222, and other electronics necessary for controlling and applying power to solenoid 210, such as, for example microcontroller 224 and H-bridge 226. PCB 220 controls solenoid 210 and receives radio frequency signal 190 sent from sending unit 160. In addition, PCB 220 is powered by battery 230 that can output a predetermined low-voltage DC, such as, for example, 4.2 volts. Battery 230 can be a rechargeable battery, such as, for example, a lithium-polymer battery or a lithium-iron-phosphate battery for high-power and high-temperature applications. In one embodiment, PCB 220 has count-down timer electronics to close solenoid 210 automatically to stop the flow of water after a predetermined period of time.

A solenoid has significant advantages over the related art where a motor is used to drive a gear to control water flow in a faucet. Firstly, the operation of solenoid 210 allows for almost instantaneous operation that does not draw current after closing or opening the valve. In other words, energy is conserved because the solenoid 210 stops using power after it has opened or closed, while a gear driven motor consumes power under load and draws significant current, such as, for example, as disclosed in the faucet described in Millman above. In addition, solenoid 210 has other significant advantages over the motors and gears disclosed in the related art, such as having lower friction, lower inertia, faster response time, fewer components and being less expensive to manufacture. Furthermore, because solenoid 210 is essentially frictionless, there is nothing to wear-out, and solenoid 210 will have a very long lifecycle before disposal is required.

In another embodiment, PCB 220 will have an LED light (not shown), visible to the user viewing the exterior of housing 240, that will illuminate when the voltage of battery 230 falls below a predetermined threshold and needs charging. In another embodiment, sending unit 160 will have an LED light (not shown) that will turn on when unit 160 needs charging. In another embodiment, PCB 220 will have sufficient electronics to trigger a sleep-mode that powers-down to conserve the energy stored in battery 230, after a predetermined period of time, when the unit is not in use. Notwithstanding efforts to conserve energy, battery 230 may still become depleted by long-term disuse or from continuous use. When it needs charging, battery 230 can be recharged by a user with an external AC/DC transformer (not shown), where the output direct-current charging wire of the transformer employs a standard male tip connector that is inserted into a standard female electrical connector (not shown) in the case of valve assembly 200 and the input power cord of the transformer is plugged into a standard 110/220 volt AC wall outlet. Alternatively, battery 230 can be charged wirelessly using resonant inductive coupling that is accomplished by commercially available technology available to those of ordinary skill in the art.

In another alternative embodiment, battery 230 can be recharged by commercially available thermoelectric generator or TEG. The TEG is a solid state device that has no moving parts and converts heat (temperature differences) directly into electrical energy through a phenomenon known as the Seebeck effect. When placed proximate to a hot water source, a small square module (not shown), about 40 mm per side, can capture heat when water is flowing through faucet 100. An electric current is thereby generated and stored in battery 230. Electronics in PCB 220 will regulate the flow of current from the TEG to battery 230.

The aforementioned described embodiments show the valve assembly 200 located proximate to nozzle 180. The proximate location of valve assembly 200 to nozzle 180 is not a limitation. The valve assembly 200 and its component parts can located anywhere in faucet 100. Furthermore, those of skill in the art will understand that the components of valve assembly 200 can be distributed anywhere in faucet 100, as required by manufacturing requirements or other concerns.

Referring to FIG. 2B, FIG. 2C, FIG. 2D and FIG. 2E, schematic drawings are shown for different perspectives of one embodiment of a solenoid 210 that is made to fit in a compact housing 240. In this embodiment the valve geometry of solenoid 210 is implemented such that the inlet water channel 212 and outlet water channel 214 are collinear with respect to each other.

Figure 3A:
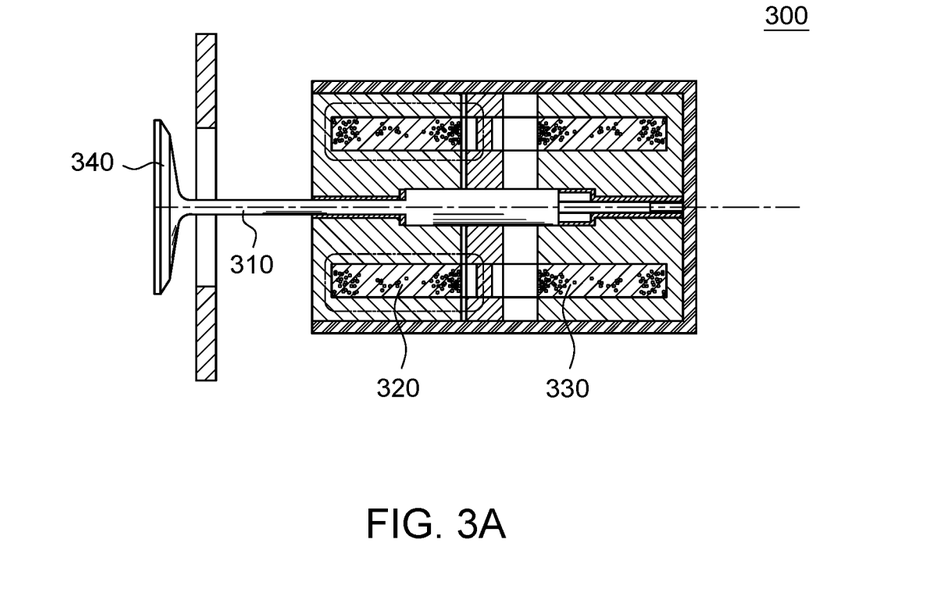
FIGS. 3A and 3B are schematic drawings of a bistable valve solenoid used in one embodiment of this invention.
Figure 3B:
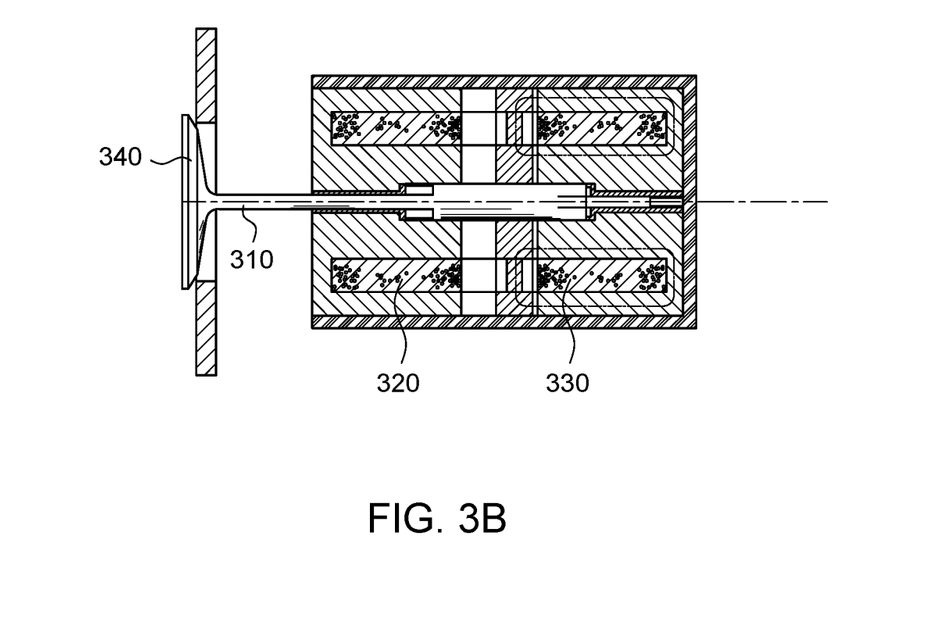

Referring to FIG. 3A and FIG. 3B, schematic drawings of a bistable valve 300 used for solenoid 210 are shown for one embodiment of the invention. FIG. 3A shows valve 300 in the open position, and FIG. 3B shows valve 300 in the closed position. Using attractive and repulsive magnetic forces, solenoid valve slider 310 is moved by coils 320 and 330 acting on the principle of electromagnetic induction to open and close valve 340. To save power, the circuit to coils 320 and 330 are automatically shut-off until the user supplies a new command. In one embodiment, the valve slider 310 will move between 2 to 3 millimeters that will take approximately 30 milliseconds, and power is only used during this movement. The bistable valve 300 relies on the water pressure behind valve 340. When valve 340 is open and no current is supplied to the internal coils 320 and 330 by PCB 220, the water pressure does not allow the valve 340 to return to the closed position. Current must be supplied to coils 320 and 330 by PCB 220 in the reverse direction to force the valve 340 back to the closed position. In one embodiment, to invert the polarity of the current to coils 320 and 330, PCB 220 incorporates H-bridge 226 to accomplish this task.

Figure 4:
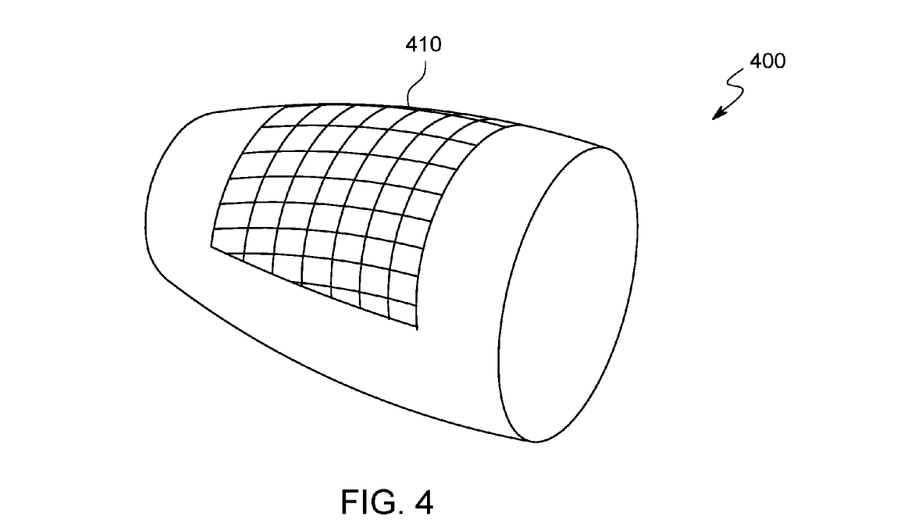
FIG. 4 is a perspective view of another embodiment of the valve assembly of one embodiment of this invention that is partially covered with solar cells.

Referring to FIG. 4, another alternative embodiment of the faucet 100 shows a valve assembly 400 with solar cells 410 enveloping the top and/or sides of the valve assembly 400. To charge battery 230, solar cells 410 can be energized using any available light source, such as, for example, windows that admit sunshine or indoor lights. Solar cells 410 are connected to battery 230 using wires (not shown).

Figure 5:
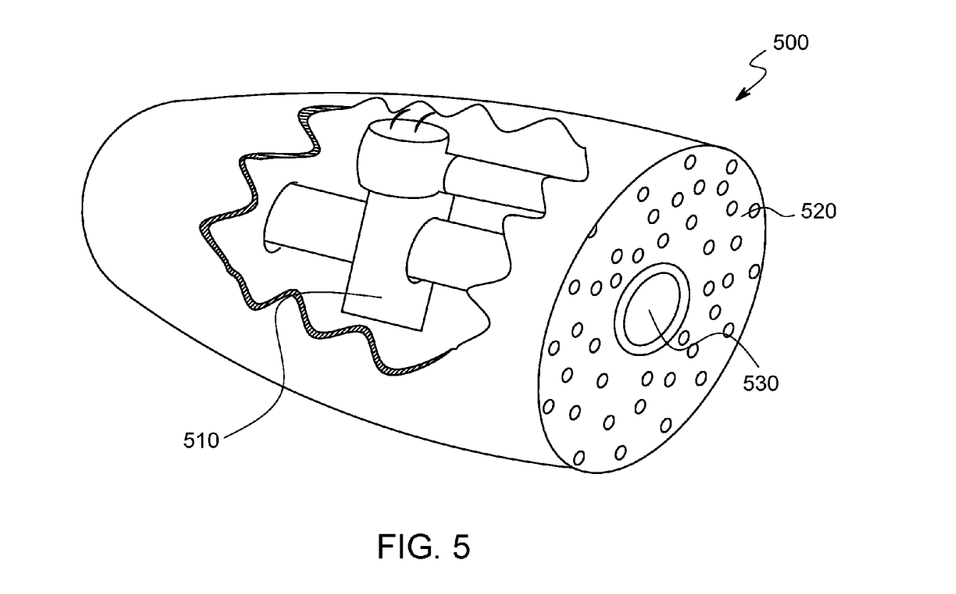
FIG. 5 is a perspective view of one embodiment of the remote controlled faucet of this invention showing an exploded view of the parts of the valve assembly where a three-port solenoid is implemented that allows for both a stream and a spray.

Referring to FIG. 5, another alternative embodiment the faucet 100 shows a valve assembly 500 where—in addition to the PCB 220 and the battery 230 (both not shown)—the valve assembly 500 contains a three-port solenoid 510, configured to switch from stream to spray, that replaces two-port solenoid 210. In one embodiment, the water flow between a collection of numerous spray nozzles 520 and a single stream nozzle 530. Remote sending unit 160 can be configured for the user to make contact so that the user can choose the flow from either nozzles 520 or nozzle 530.

Figure 6:
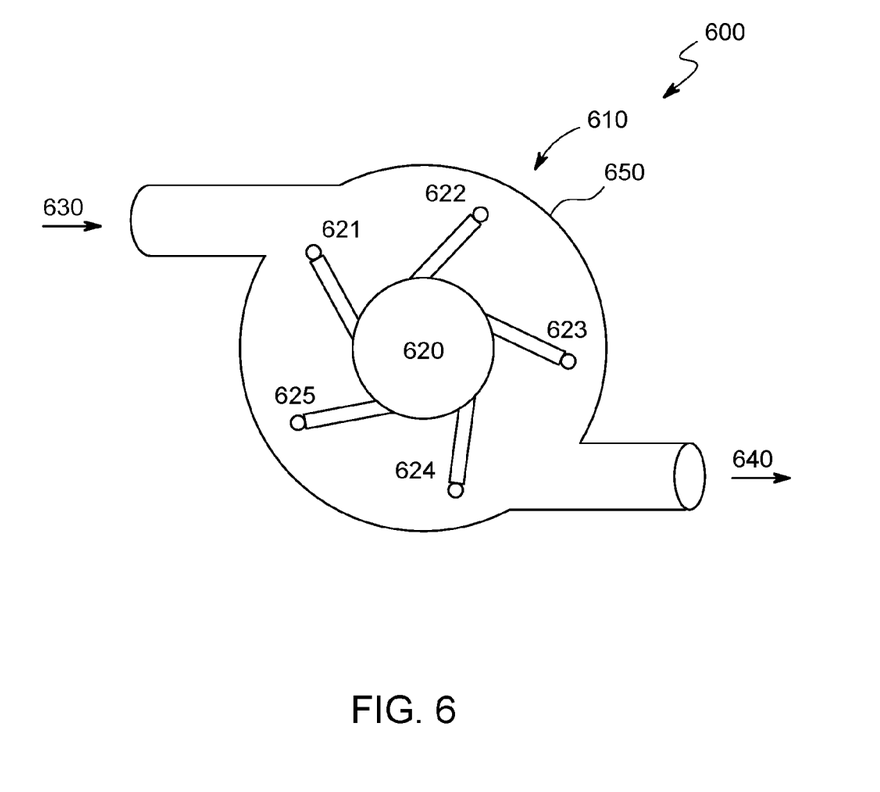
FIG. 6 is a schematic view of a cross-section of a miniature hydroelectric generator that is part of the valve assembly and used for the purpose of recharging a battery in one embodiment of this invention.

Referring to FIG. 6, in another alternative embodiment of the faucet 100, a valve assembly 600 contains—in addition to the two-port solenoid 210, PCB 220 and the battery 230 (all not shown here)—a self-contained, miniature hydroelectric generator 610. Generator 610 converts the running water into DC electricity. FIG. 6 shows a cross section of the generator 610. Turbine 620 has magnets connected to the ends of vanes 621, 622, 623, 624 and 625 that rotate counterclockwise. The enclosure 650 has an electrically conducting metal coil (not shown) that is tightly wound around the enclosure 650 with a predetermined number of turns. Water enters port 630 and exits via port 640 under pressure and thereby spins turbine 620, inducing a current through said metal coil using the principle of electromagnetic induction. Electronics either inside generator 610 or on PCB 220 rectifies the AC current to DC current. Leads from said metal coil (not shown) are connected to charging electronics for recharging battery 230.

In another alternative embodiment of the invention, the valve assembly 200 will have a microphone that controls the water flow by the user's voice commands. The microphone can be attached to either the surface of valve assembly 200 or located on the sending unit 160 or on an external puck (not shown). In this embodiment, PCB 220 shall contain commercially available voice recognition ICs and software, well-known to those of ordinary skill in the art, to activate solenoid 210 or 510, depending on the embodiment. For example, when solenoid 210 is employed, a user can speak the words "Flow on" or "Water Off." For example, when solenoid 510 is employed, a user can speak the works "spray" or "stream" to control the type of flow desired.

In another alternative embodiment, the valve assembly 200 contains an internal motor that adjusts a manifold for varying the amount of flow dispensed as a stream or a spray. This internal motor can either be responsive to remote sending unit 160 or to voice commands from a microphone.

Figure 7:
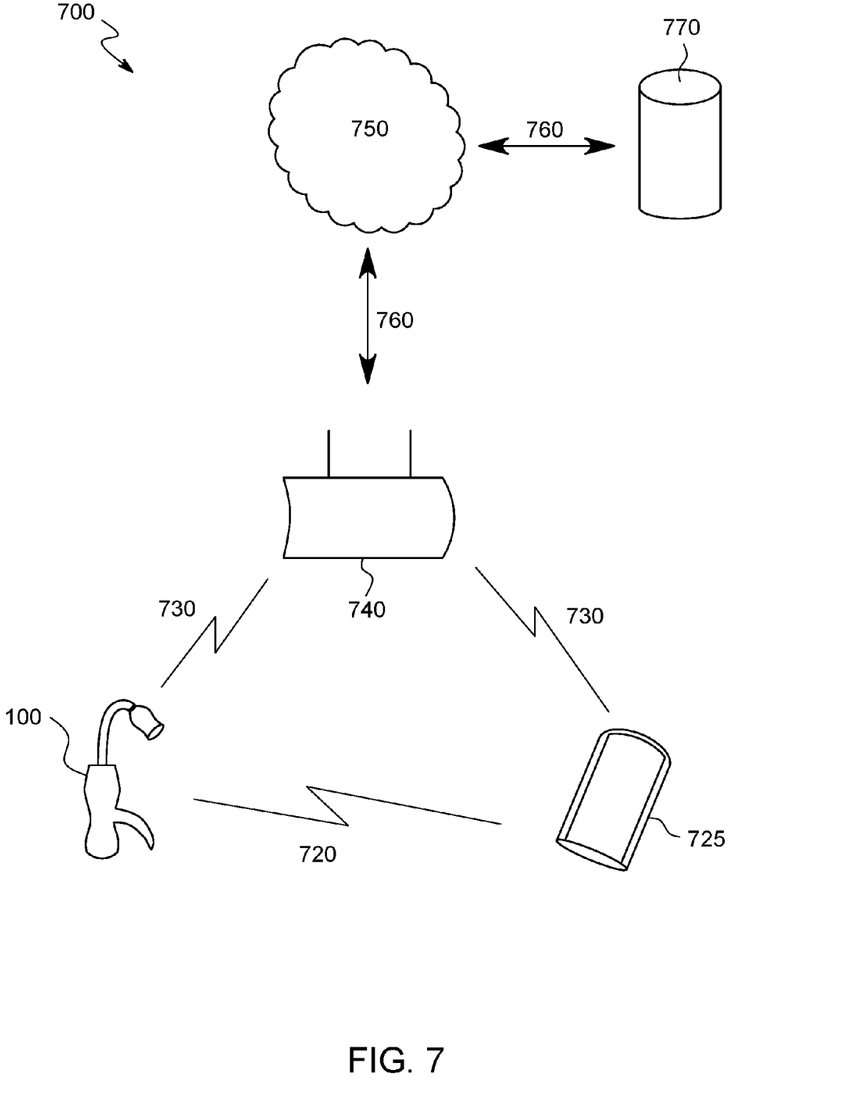
FIG. 7 illustrates the architecture of one embodiment of this invention where a remote controlled faucet is in communication with a local area network that is connected to the Internet.

Referring to FIG. 7, in another embodiment, valve assembly 200—in one or more faucets 100—is made part of the Internet of Things 700, where relevant information collected by faucet 100 can be made available to a homeowner, building manager, water company, or any other entity interested in using the information that can be collected by faucet 100. For example, in addition to the ICs described above, PCB 220 may also connect to one or more sensors (not shown) that collect information on the condition of the water flowing from nozzle 180 and send it to a memory in microcontroller 224. This information can bundled into a data set 710 to include one or more of the following: (a) water volume, (b) how much time the water is flowing, (c) water temperature, (d) the presence of one more pathogens, and (e) the presence of one or more heavy metals. In one embodiment, the foregoing information may be transmitted to a local area network using Bluetooth 720 to a local device 725, such as a smartphone or tablet, and/or using WiFi 730 to a modem/router 740 and to the Internet 750 using standard TCP/IP protocols 760.

In the aggregate, data sets 710 from one or more faucets 100, can be processed on server 770 using applications that allow users of faucet 100 and others to review and understand the quality of the water and how the water is used. These communication signals are implemented using protocols used by standard commercially available wireless communications ICs (not shown) in valve assembly 200 to send data to a smartphone, tablet, router, modem, server or other device for processing and review, using software and techniques well known to those of skill in the art, such as, for example, applications developed for use on the World Wide Web. Furthermore, in another embodiment the numerous data sets 710 can be tagged with location data or other user specific information, such as an IP address. These data sets 710 can be used by applications running on server 770 or other servers to target the users of faucets 100 with advertisements that may be of interest to said users.

Figure 8:
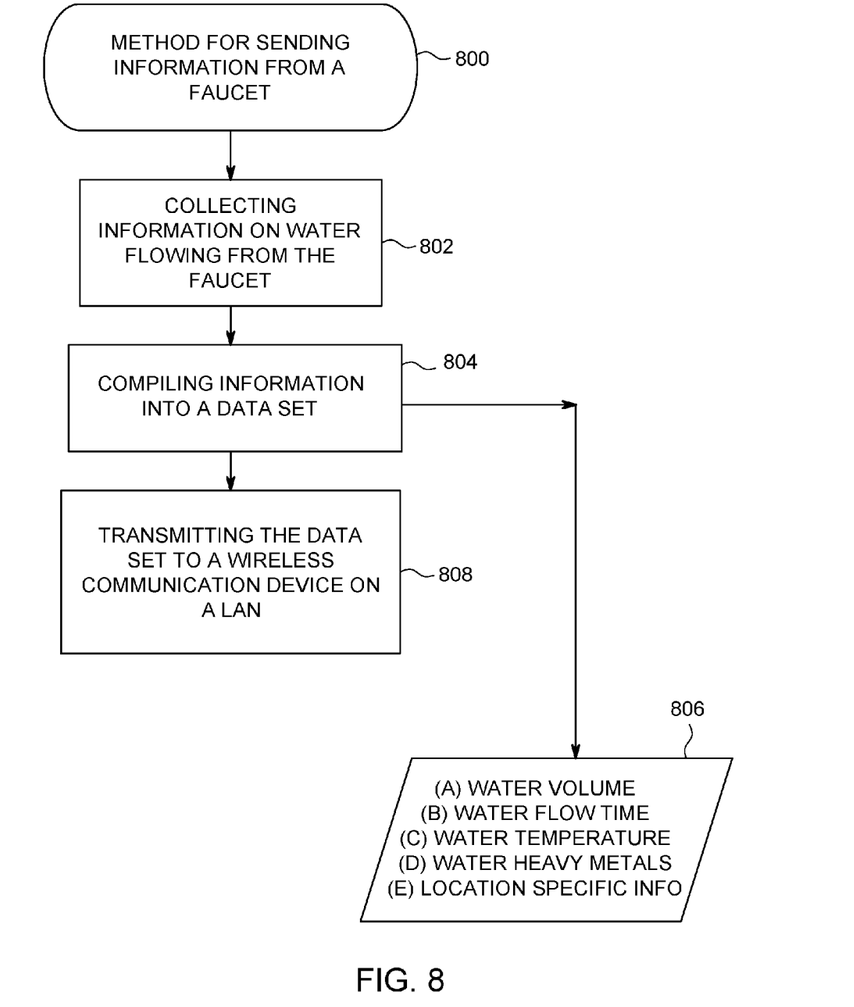
FIG. 8 is a flowchart illustrating the steps in one embodiment of a remote controlled faucet to send data to devices connected to a local area network.

Referring to FIG. 8, a flowchart illustrating a method 800 for the steps used by one embodiment of a remote controlled faucet 100 to send data to devices in communication with faucet 100. Process block 802 illustrates collecting information of interest on the water flowing from faucet 100. Process block 804 illustrates compiling the information collected from faucet 100. Data block 806 illustrates one embodiment of data that is compiled on the water flowing from faucet 100. Process block 808 illustrates transmitting the data set to one or more wireless communication devices connected to a local area network.

Figure 9:
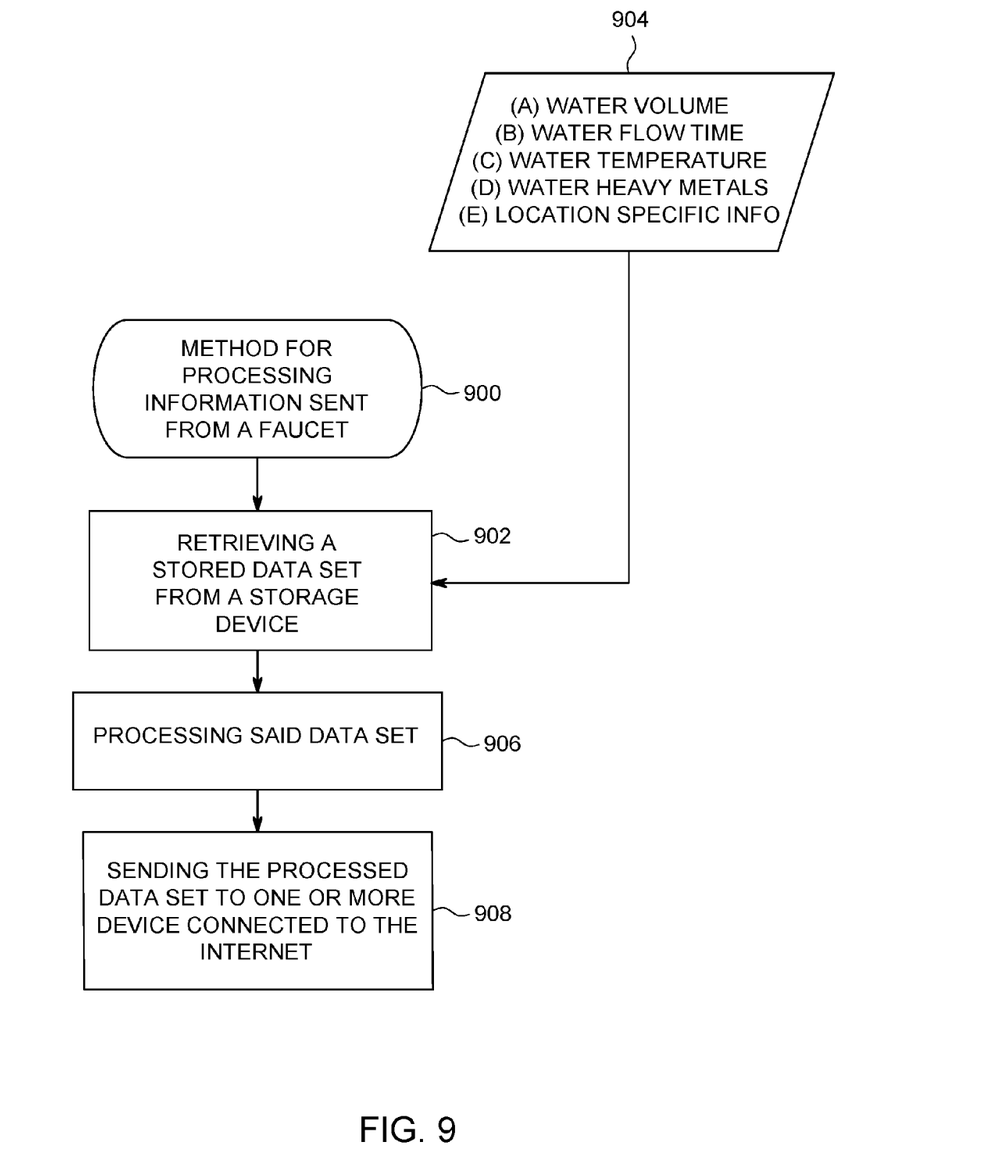
FIG. 9 is a flowchart illustrating the steps in one embodiment used to retrieve and process stored information previously sent from a remote controlled faucet.

Referring to FIG. 9, a flowchart illustrating a method 900 for the steps in one embodiment used for processing stored information sent from a faucet 100. Process block 902 illustrates retrieving a stored data set from a storage device, such as, for example, a server. Data block 904 illustrates one embodiment of the data that is stored. Process block 906 illustrates processing said data set. Process block 908 illustrates sending the processed data set to one or more devices connected to the Internet, such as, for example, using web pages on the World Wide Web that can contain information on water quality and/or usage valued by a user of faucet 100, along with advertisements that can be targeted to users of faucet 100.

The foregoing described embodiments of the invention are provided as illustrations and descriptions. They are not intended to limit the invention to the precise form described. Other variation and embodiments are possible in light of the above teachings, and it is thus intended that the scope of the invention not be limited by the Detailed Description, but rather by the Claims that follow.

What is claimed is:

1. A system comprising:
a self-contained valve assembly configured for attachment to a faucet, the self-contained assembly comprising:
a solenoid valve for remotely controlling water flow through the faucet;
an electronic circuit for controlling the solenoid, wherein the circuit includes a radio receiver;
a circuit for charging a rechargeable battery, the circuit including an AC/DC transformer and a built-in ground fault circuit interrupter (GFCI) for recharging the battery, wherein the transformer comprises a wired connector for making electrical contact with the rechargeable battery to supply DC power and an electrical cord and plug for receiving AC power from a conventional wall socket;
the rechargeable battery configured to provide power to the solenoid and electronic circuit, wherein the solenoid valve, electronic circuit, and battery are proximate to each other and located in the faucet; and
a remote sending unit configured to be located outside of the faucet, the remote sending unit being configured to wirelessly transmit commands to the radio receiver, the commands being responsive to application of pressure thereto by a user and including at least one of a command to turn on the flow of water through the faucet and a command to turn off the flow of water through the faucet.

2. The system of claim 1, wherein the solenoid valve connects to an inlet water channel and an outlet water channel of the faucet, the inlet water channel and the outlet water channel being collinear.

3. The system of claim 1, wherein the solenoid valve is a bistable solenoid valve.

4. The system of claim 1, wherein the wirelessly transmitted commands are made using a radio frequency signal.

5. The system of claim 1, wherein the circuit for charging the rechargeable battery, further comprises:
wireless charging electronics for wirelessly charging the rechargeable battery.

6. The system of claim 1, wherein the circuit for charging the rechargeable battery, further comprises:
one or more solar cells for recharging the rechargeable battery.

7. The system of claim 1, further comprising:
a miniature hydroelectric generator for recharging the rechargeable battery.

8. The system of claim 1, wherein the solenoid valve includes at least one of a first port for receiving water, a valve for selectively sending water to a second port that exits a nozzle, and a third port that exits to a spray.

9. The system of claim 1, further comprising:
a manifold for adjusting the flow of water exiting the faucet.

10. The system of claim 1, further comprising:
a microphone and the addition of speech recognition electronics in the circuit for controlling the solenoid valve responsively to a received a voice command.

11. The system of claim 1, wherein the circuit further comprises:
electronics for entering a sleep mode to conserve the battery.

12. The system of claim 1, wherein the circuit further comprises:
electronics for automatically stopping water flow by closing the solenoid valve after a predetermined period of time.

13. The system of claim 1, wherein the circuit further comprises:
an LED light that is visible to a user of the system when a level of charge for the rechargeable battery falls below a predetermined threshold.

* * * * *